Patented June 14, 1949

2,473,486

UNITED STATES PATENT OFFICE 2,473,486

PREPARATION OF 1-CYANO-1,3-BUTADIENE

Paul H. Wise, Rocky River, Ohio, assignor to Wingfoot Corporation, Akron, Ohio, a corporation of Delaware No Drawing. Application June 17, 1947, Serial No. 755,233

4 Claims. (Cl. 260—465.9)

This invention relates to a method for the preparation of 1-cyano-1,3-butadiene, also known as 2,4-pentadienenitrile.

The preparation of 1-cyano-1,3-butadiene is carried out in an unusual manner by a novel treatment of 3,4-epoxy-1-butene, and sometimes referred to as butadiene monoxide. This novel treatment of 3,4-epoxy-1-butene results in the production of a mixture of a by-product, 1-cyano-3-butene-2-ol, and the desired end product, 1-cyano-1,3-butadiene. The separation of this mixture into its component parts is a difficult operation. However, it has been discovered that this mixture need not be separated into its component parts but may be treated in such a way that the by-product is converted to the desired end product. This conversion is brought about by treating the mixture with an aliphatic acid or its anhydride to produce a mixture containing the desired end product and 1-cyano-2-acyloxy-3-butene, and also referred to as 3-acyloxy-4-pentenenitrile. This resulting mixture in turn is pyrolyzed to produce a substantial yield of the desired end product, 1-cyano-1,3-butadiene, having a boiling point of 45–50°/20 mm.

was present in only a trace. However, when the mixture was heated at 20° for only two hours, about 40% of 1-cyano-3-butene-2-ol was produced, whereas no trace of the desired end product was found.

Regardless of the time, which may range from 1 hour to 10 hours, and temperature, which may range from 0° C. to 60° C., used in the treatment of 3,4-epoxy-1-butene, the resulting mixture may be treated with an acid anhydride to cause the acylation of the resulting 1-cyano-3-butene-2-ol. Thus a mixture containing the desired end product and 146 parts of 1-cyano-3-butene-2-ol was added slowly to 168 parts of acetic anhydride containing 2 parts of an acylation catalyst, for example, concentrated sulfuric acid. This mixture was allowed to stand overnight, after which time 10 parts of sodium acetate was added, and after shaking for a few minutes the solids were removed by filtration. A yield of 77% of 1-cyano-2-acetoxy-3-butene boiling at 115–119.5° C./25 mm. was obtained.

Any aliphatic acid or acid anhydride may be used in the acylation reaction, including the following alkyl acids: acetic acid, propionic acid, butyric acid, valeric acid, caproic acid, enanthic

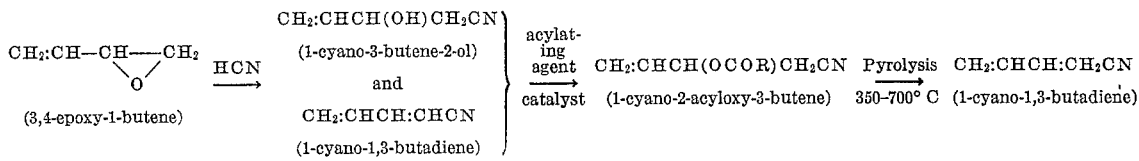

In more detail the invention comprises the treatment of 3,4-epoxy-1-butene with hydrogen cyanide which is formed by passing carbon dioxide gas into a vigorously stirred mixture of 175 parts of 3,4-epoxy-1-butene, 200 parts of sodium cyanide, 750 parts of water and 5 parts of a polymerization inhibitor such as hydroquinone. The reaction temperature may be regulated by the rate of carbon dioxide addition and by external cooling or heating.

When 3,4-epoxy-1-butene was treated in the manner just described, it was found that a mixture containing approximately 13% of the desired end product and about 24% of 1-cyano-3-butene-2-ol was obtained when the treatment was carried out at a temperature of 27–35° C. for four hours. It was also observed that when the treatment was carried out at about 20° C. for 4 to 4.5 hours, the yield of 1-cyano-3-butene-2-ol was increased to 38–40%, while the amount of desired end product, 1-cyano-1,3-butadiene, acid, caprylic acid, myristic acid, stearic acid, behenic acid, etc.

The conversion of the acylated mixture to the desired end product is brought about by pyrolysis of the mixture. The mixture containing a predominant part of 1-cyano-2-acetoxy-3-butene is passed through a reaction zone heated to a temperature sufficient to cause the removal of the acetoxy radical as acetic acid and the consequent production of the desired end product. A mixture containing the desired end product and 176 parts of 1-cyano-2-acetoxy-3-butene was passed through a pyroysis tube having an inside diameter of 1 inch and having 30 inches of its length heated at a temperature maintained at 560–575° C. and packed throughout the heated zone with ¼ inch Berl saddles during a period of 3¼ hours. A reduced pressure of 200–225 mm./Hg was maintained on the system with a cold trap in dry ice-chloroform-carbontetrachloride connected between the icepacked receiver and the vacuum line. A total of 160 parts of material was collected in the receiver. This material was washed with water to remove the acetic acid and then finally washed with dilute sodium bicarbonate solution. The desired end product was then washed with saturated sodium chloride and dried with calcium chloride and then distilled in the presence of hydroquinone to produce 51 parts of the desired end product, 1-cyano-1,3-butadiene; B. P. 45–50°/20 mm.; $n_D^{23.5}$ 1.48650; $d_{15}^{26.5}$ 0.8539, a yield of 51%.

The pyrolysis may be carried out using temperatures ranging from 350° C. to 700° C. but the preferred range is 450–600° C. Temperatures lower than 450° C. give a lesser conversion to the desired product. Above 600° there is increasing decomposition and polymerization of the desired product. The pressure on the system is usually reduced although it may range upward to atmospheric pressure. The period of time in the reaction zone is ordinarily comparatively short, the rate of flow being adjusted to give maximum yields with a minimum of by-products. Generally the contact time varies inversely with the temperature used.

The desired end product 1-cyano-1,3-butadiene is a valuable starting material in the manufacture of rubber substitutes and useful masses may be obtained from this monomer under conditions of polymerization. Useful masses may also be obtained when this monomer is copolymerized with another copolymerizable monomer, particularly styrene, acrylonitrile and the acrylates.

While there have been described above the preferred embodiments of the invention, it will be apparent to those skilled in the art that various modifications and changes may be made therein without departing from the spirit of the invention or the scope of the appended claims.

I claim:

1. The method of producing 1-cyanobutadiene-1,3 which comprises acylating a difficultly separable mixture comprising essentially 1-cyanobutadiene-1,3 and 1-cyano-3-butene-2-ol and pyrolyzing the acylated mixture.

2. The method of producing 1-cyanobutadiene-1,3 which comprises acylating a difficultly separable mixture of 1-cyanobutadiene-1,3 and 1-cyano-3-butene-2-ol, the mixture resulting from the treatment of 3,4-epoxy-1-butene with hydrogen cyanide, and then pyrolyzing the acylated mixture to convert the acylated compound to 1-cyanobutadiene-1,3.

3. The method of producing 1-cyanobutadiene-1,3 which comprises acylating a difficultly separable mixture of 1-cyanobutadiene-1,3 and 1-cyano-3-butene-2-ol, the mixture resulting from the treatment of 3,4-epoxy-1-butene with hydrogen cyanide, and then pyrolyzing the acylated mixture at 450–600° C. to convert the acylated compound to 1-cyanobutadiene-1,3.

4. The method of producing 1-cyanobutadiene-1,3 which comprises acylating a difficultly separable mixture of 1-cyanobutadiene-1,3 and 1-cyano-3-butene-2-ol, the mixture resulting from the treatment of 3,4-epoxy-1-butene with hydrogen cyanide at 0–60° C., and then pyrolyzing the acylated mixture at 450–600° C. to convert the acylated compound to 1-cyanobutadiene-1,3.

PAUL H. WISE.

REFERENCES CITED

The following references are of record in the file of this patent:

UNITED STATES PATENTS

| Number | Name | Date |
| --- | --- | --- |
| 2,205,239 | Carter et al. | June 18, 1940 |
| 2,264,025 | Gudgeon et al. | Nov. 25, 1941 |
| 2,264,026 | Gudgeon | Nov. 25, 1941 |
| 2,364,422 | Brooks | Dec. 5, 1944 |

FOREIGN PATENTS

| Number | Country | Date |
| --- | --- | --- |
| 348,134 | Great Britain | Apr. 30, 1931 |

OTHER REFERENCES

Petrov, Chem. Abstracts, vol. 37, column 1699 (1943).